United States Patent [19]

Kobayashi

[11] Patent Number: 4,827,172
[45] Date of Patent: May 2, 1989

[54] DC MOTOR WITH ROTOR SLOTS CLOSELY SPACED

[75] Inventor: Koji Kobayashi, Gumma, Japan

[73] Assignee: Mitsuba Electric Mfg., Co., Ltd., Japan

[21] Appl. No.: 167,009

[22] Filed: Mar. 9, 1988

[30] Foreign Application Priority Data

Mar. 10, 1987 [JP] Japan .................................. 62-54378

[51] Int. Cl.$^4$ ............................................. H02K 3/04
[52] U.S. Cl. .................................. 310/216; 310/207; 310/208
[58] Field of Search ............... 310/207, 208, 214, 216, 310/218, 261, 262, 211

[56] References Cited

U.S. PATENT DOCUMENTS

| 4,038,575 | 7/1977 | Nordebo | 310/179 |
| 4,260,925 | 4/1981 | Barrett | 310/216 |
| 4,559,463 | 12/1985 | Kobayashi | 310/211 |
| 4,591,766 | 5/1986 | Takaba | 310/216 |

FOREIGN PATENT DOCUMENTS

| 485357 | 3/1970 | Switzerland | 310/216 |
| 2163608A | 2/1986 | United Kingdom | |

Primary Examiner—Patrick R. Salce
Assistant Examiner—D. L. Rebsch
Attorney, Agent, or Firm—Darby & Darby

[57] ABSTRACT

A direct current motor includes a substantially cylindrical rotor core and a lead wire wound around the rotor core to form a rotor coil. The rotor core has a plurality of shallower and deeper slots circumferentially and alternately disposed in the peripheral face of the rotor core at angular intervals about the center axis of the rotor core so that each of the shallower and deeper slots extends axially from the front face to the rear face of the rotor core. Each of the shallower slots includes first outer and inner radially aligned sections, each receiving a portion of the lead wire. Each of the deeper slots includes: second outer and inner radially spaced sections, each receiving a portion of the lead wire; and a neck section interposed between the second outer and inner sections. The distance between the second outer section of each deeper slot and the center axis of the rotor core is substantially equal to the distance between the center axis of the rotor core and the first outer section of each shallower slot. The distance between the second outer and inner sections of each deeper slot is longer than the distance between the first outer and inner sections of each shallower slot. The width of the neck section is substantially smaller than widths of the second outer and inner sections.

13 Claims, 3 Drawing Sheets

DC MOTOR WITH ROTOR SLOTS CLOSELY SPACED

BACKGROUND OF THE INVENTION

This invention relates to a direct current motor such as a starting motor for an engine and the like, and more specifically, the invention relates to a motor using a rotor core which has two different types of slots.

Conventional dc motors, generally, have rotor cores provided with a plurality of slots for receiving lead wires which constitute the rotor coils. These slots are circumferentially formed in the peripheral face of a rotor core so that an axially extending tooth is formed between any two adjoining slots. In a dc motor of this type, it is apparent that the power output of the motor can be increased by increasing the number of turns of the lead wire, in other words, the number of the slots. However, since increasing the number of the slots results in a decrease in the thicknesses of the teeth, the number of the slots which it is possible to form in a rotor core is limited to a predetermined value depending on the slots' widths. More specifically, the number and widths of the slots must be such that they allow each tooth of the rotor core sufficient thickness for maintaining a proper mechanical strength. Furthermore, the excess slots reduce the thicknesses of the teeth to a dimension such that an abrupt increase in the magnetic resistance of the teeth is caused, which results in no substantial increase of the power output. Use of flat lead wires with the corresponding thin slots may enable the rotor core to have more slots than that of customary round lead wires. However, the bending of the flat wires, which is required upon winding the wires around the core, is not as easy as the bending of the round wires.

SUMMARY OF THE INVENTION

Accordingly, it is an object of the present invention to provide a direct current motor in which the rotor core is enabled to have more slots than the rotor core of the conventional dc motors without either reducing the thicknesses of the teeth or using flat wires, and thereby making it possible to effectively increase the power output in comparison with that of conventional motors.

With this and other objects in view, the present invention provides a direct current motor including a substantially cylindrical rotor core and a lead wire wound around the rotor core to form a rotor coil. The rotor core has a plurality of shallower slots and a plurality of deeper slots. The shallower and deeper slots are circumferentially and alternately disposed in the peripheral face of the rotor core at angular intervals about the center axis of the rotor core so that each of the shallower and deeper slots extends axially from the front face to the rear face of the rotor core, whereby axially extending teeth are formed among the shallower and deeper slots. Each of the shallower slots includes first outer and inner radially aligned sections, each receiving a portion of the lead wire. Each of the deeper slots includes: second outer and inner radially spaced sections, each receiving a portion of the lead wire; and a neck section interposed between the second outer and inner sections. The distance between the second outer section of each deeper slot and the center axis of the rotor core is substantially equal to the distance between the center axis of the rotor core and the first outer section of each shallower slot. The distance between the second outer and inner sections of each deeper slot is longer than the distance between the first outer and inner sections of each shallower slot. The width of the neck section is substantially smaller than widths of the second outer and inner sections.

In this arrangement, the neck section of each deeper slot 36 circumferentially adjoins the inner sections of the shallower slots which adjoin the corresponding deeper slot 36, allowing each tooth to maintain a greater thickness than it would be allowed in the conventional motor. More specifically, the arrangement of the shallower and deeper slots enables the rotor core to have teeth such that the thickness of the inner portion of a tooth is equal to or greater than that of the outer portion of the tooth. Accordingly, the teeth are capable of being assured of a greater mechanical strength than the teeth of conventional dc motors, or the rotor core is enabled to have more slots than the rotor core of the conventional dc motors. Furthermore, since the distance between the first outer section of each shallower slot and the center axis of the rotor core is substantially equal to the distance between the second outer section of each deeper slot and the center axis of the rotor core, no substantial turbulence of magnetic flux is induced in the rotor core, and thus, the power output of the motor is not decreased.

It is preferred that the distance between the second outer and inner sections of each deeper slot is not less than twice, and more preferably substantially twice, as long as the distance between the first outer and inner sections of each of the shallower slots.

The second outer section of each deeper slot may be arranged at such a position that an imaginary line extending between the centers of the respective second outer and inner sections of each deeper slot inclines at an angle $\theta$ to an imaginary line extending between the center of the rotor core and the center of the second inner section of the same deeper slot. The angle $\theta$ is such that it causes the distance between the second outer section of any one of the deeper slots and the second inner section of another predetermined one of the deeper slots to be substantially equal to the distance between the first outer section of any one of the shallower slots and the first inner section of another predetermined one of the shallower slots.

Each of the teeth may have its inner portion as thick as or thicker than its outer portion.

The number of the shallower slots may exceed the number of the deeper slots by one. Otherwise, the number of the shallower slots may be equal to the number of the deeper slots. When the numbers of respective shallower and deeper slots are equal, the total number K of the shallower and the deeper slots should be defined by the following formula:

$$K = (n+N) \times (P/2) \pm 1$$

where n is the back pitch of the rotor coil, N is the front pitch of the rotor coil, and P is the number of the field poles of the motor.

It is also preferred that the lead wire is wound around the rotor core in the manner of wave winding.

The lead wire may be a plurality of U-shaped formed wire pieces electrically connected to one another. The one of the end portions of each wire piece is received in one of the first and second outer sections of one of the corresponding shallower and deeper slots, and the other end portion of each wire piece is received in one of the first and second inner sections of another one of the corresponding shallower and deeper slots.

DETAILED DESCRIPTION OF THE PREFERRED EMBODIMENTS

Figure 1:
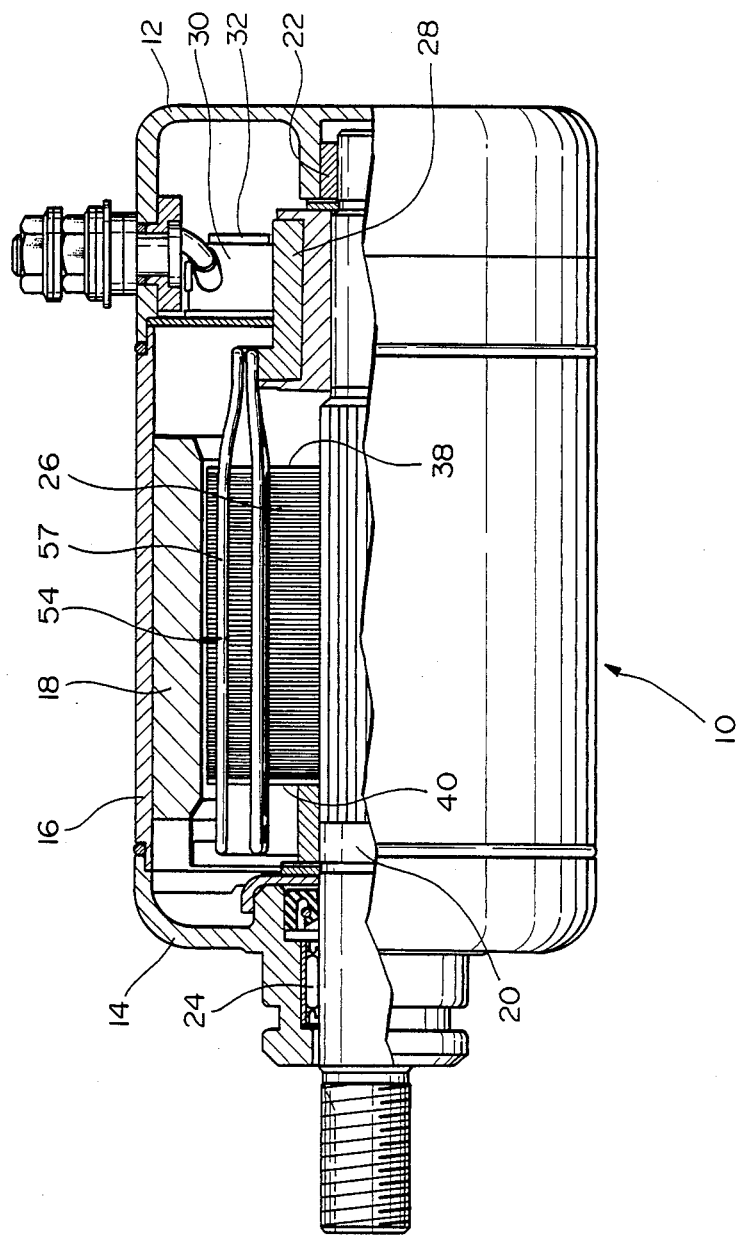
FIG. 1 is a side-elevational view partly in section of a dc motor according to the present invention.

Referring now to the drawings, wherein like reference characters designate corresponding parts throughout several views, and descriptions of the corresponding parts are omitted once given.

Referring to FIG. 1 reference numeral 10 designates a dc starting motor according to the present invention. This motor has opposite end frames 12 and 14 and a substantially cylindrical yoke 16 extending between the opposite end frames 12 and 14. A plurality of permanent magnets 18 are circumferentially disposed and attached to the inner surface of the yoke 10. A rotation shaft 20 is supported at its opposite ends respectively by the end frames 12 and 14 via bearings 22 and 24 so that it is coaxially disposed inside the yoke 16 for rotational movement about its axis. A cylindrical rotor core 26 is fixedly fitted around the intermediate portion of the rotation shaft 20. This rotor core 26 is a laminated core, that is, the core 26 is made of a plurality of ring-shaped sheet irons put one on top of another. A commutator 28 is attached to end portion of the rotation shaft 20. A brush holder 30 is secured to the end frame 12 so as to be disposed over the commutator 28. Brushes 30 held in the brush holder 32 are urged radially inward against the commutator 28 for electrical contact with the commutator.

Figure 2:
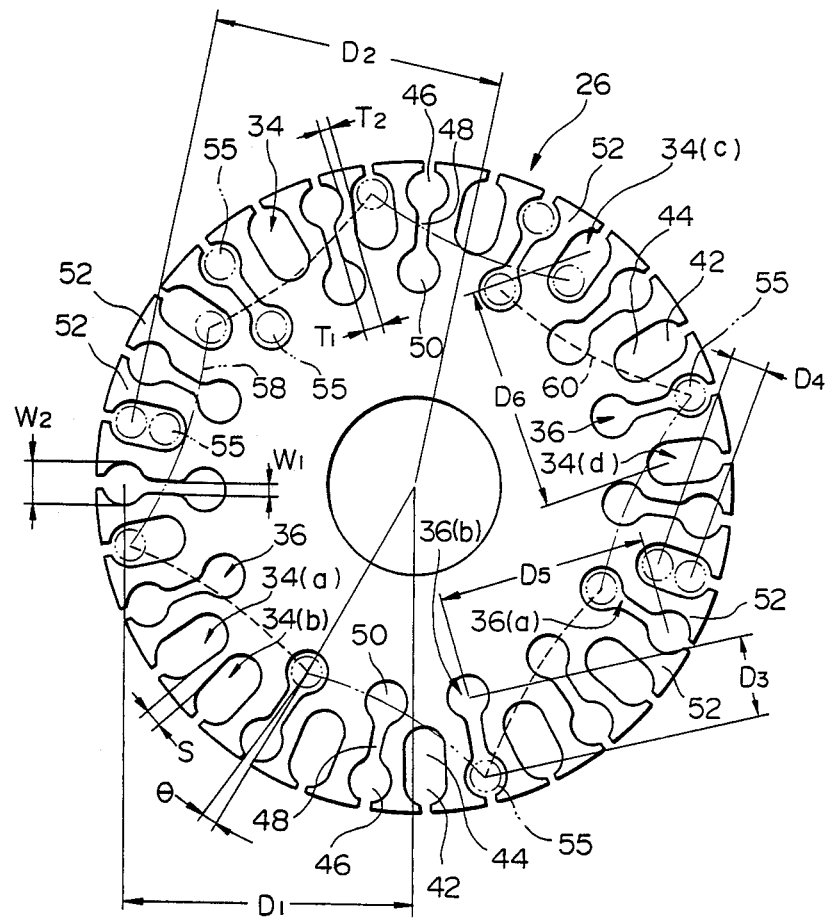
FIG. 2 is an enlarged front view of a rotor core in FIG. 1.
Figure 3:
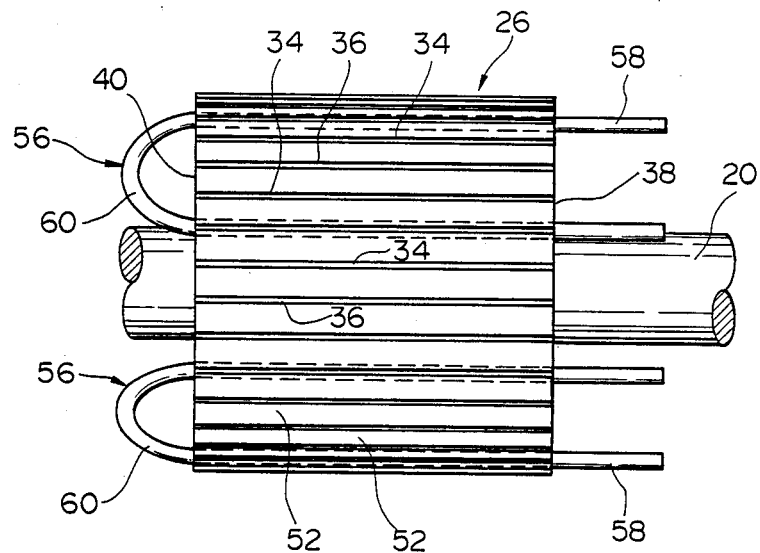
FIG. 3 is a side-elevational view of the rotor core with some of wire pieces inserted into slots.

As shown in FIG. 2, the rotor core 26 has a plurality of shallower slots 34 formed in the peripheral face thereof so as to be circumferentially arranged at angular intervals about the axis of the core 26. All the intervals, except for one lesser interval S, are substantially equal. Each of the shallower slots 34 is of semienclosed configuration having a substantially elliptic cross section, and extends from the front end face 38 of the rotor core 26 to the rear end face 40 thereof (see FIG. 3). Also, each of the shallower slots 34 includes two radially aligned sections, namely, outer and inner sections 42 and 44, each being adapted to receive a portion 55 of a round lead wire 57 in such a manner that two portions 55 of the wire in the respective outer and inner sections 42 and 44 are almost in contact with each other.

The rotor core 26 also has a plurality of deeper slots 36 formed in the peripheral face thereof in such a manner that each of those portions of the rotor core 26 among the shallower slots 34 has one of the deeper slots 36. That is, each deeper slot 36 is interposed between two adjoining shallower slots 34, and thereby a tooth 52 which extends from the front end face 38 to the rear end face 40 of the rotor core 26 is formed between each shallower slot 34 and the adjoining deeper slot 36. Since, in this embodiment, the number of the shallower slots 34 exceeds the number of the deeper slots 36 by one, there is an exception to the arrangement of the shallower and deeper slots 34 and 36, that is, no deeper slot 36 is interposed between the specific two adjoining shallower slots 34(a) and 34(b) between which there is the lesser interval S. This smaller interval S is substantially equal to the interval between any shallower and deeper adjoining slots 34 and 36. Each of the deeper slots 36 is of semienclosed configuration having a substantially dumbbell-shaped cross section, and includes three radially aligned sections, namely, an outer cylindrical section 46, a neck section 48 and an inner cylindrical section 50. Each of the outer and inner cylindrical sections 46 and 50 is adapted to receive a portion 55 of the round lead wire 57 in such a manner that two portions 55 of the lead wires 57 in the respective outer and inner cylindrical sections 46 and 50 are radially spaced apart from each other. The distance $D_1$ between the outer cylindrical section 46 and the center axis of the rotor core 26 is substantially equal to the distance $D_2$ between the shallower slot's outer section 42 and the center axis of the rotor core 26. The distance $D_3$ between the outer and inner cylindrical sections 46 and 50 of each deeper slot 36 is twice as long as the distance $D_4$ between the outer and inner sections 42 and 44 of each shallower slot 34. The neck section 48 which extends between the outer and inner cylindrical sections 46 and 50 has a width $W_1$ considerably smaller than the width $W_2$ of the remainder of the deeper slot 36. Consequently, the neck section 48 of each deeper slot 36 circumferentially adjoins the inner sections 44 of the shallower slots 34, allowing each tooth 52 to maintain a greater thickness than it would be allowed in the conventional motor. More specifically, although it is impossible for the conventional motor with uniform slots to have teeth such that the thickness of the inner portion of a tooth is equal to or larger than that of the outer portion of the tooth, it is possible for the motor of this invention. For instance, as shown in FIG. 2, the thickness $T_1$ of the inner portion of each tooth 52 is larger than thickness $T_2$ of the outer portion of the tooth 52.

As best shown in FIG. 2, with respect to the inner cylindrical section 50 of each deeper slot 36, the outer section 46 of the same slot 36 is arranged at a such position that an imaginary line extending between the centers of the respective outer and inner cylindrical sections 46 and 50 inclines at a slight angle $\theta$ to an imaginary line extending between the center of the inner cylindrical section 50 and the center of the rotor core 26. The angle $\theta$ is such that it causes the distance $D_5$ between the outer cylindrical section 46 of each deeper slot 36(a) and the inner cylindrical section 50 of the 3rd deeper slot 36(b) (i.e., the 5th slot, by counting both deeper and shallower slots) from the slot 36(a) to be substantially equal to the distance $D_6$ between the outer section 42 of each shallower slot 34(c) and the inner section 44 of the 3rd shallower slot 34(d) (i.e., the 5th slot, by counting both shallower and deeper slots) from the slot 34(c). Such an arrangement enhances workability in winding a rotor coil around the rotor core 26 as described later on.

The rotor core 26 thus constructed is provided with a rotor coil 54 wound therearound in the manner of double-layer wave winding. Both the front pitch and the back pitch of the rotor coil 54 are, for example, four. In practice, the rotor coil 54 consists of a plurality of U-shaped formed wire pieces or U-shaped round lead wire pieces 56 inserted from the rear end face 40 of the rotor core 26 into the slots and thus straddling four teeth 52 (see FIG. 3). More specifically, each wire piece 56 is inserted into the slots in such a manner that one of the end portions of the wire piece 56 is received in the outer section 42 of a shallower slot 34 or in the outer cylindrical section 46 of a deeper slot 36 and that the other end portion of the wire piece 56 is received in the inner section 44 of another proper shallower slot 34 or in the inner cylindrical section 50 of another proper deeper slot 36. The ends of each wire piece 56 project from the front end face 38 of the rotor core 26 and are electrically connected to other suitable wire pieces 56 to form the wave-winding rotor coil 54. That is, the phantom lines in FIG. 2 designate the connected ends 58 of the wire pieces 56 projecting from the front end face 38 of the rotor core 26, and the broken lines in FIG. 2 designate the arcuately-shaped portions 60 of the wire pieces 56 projecting from the rear end face 40 of the rotor core 26. The connected ends 58 of the rotor coil 54 are electrically connected to the commutator segments of the commutator 28 respectively in the conventional manner. In winding or constructing such a rotor coil 54, since the aforementioned distance $D_5$ is equal to the distance $D_6$, it is not necessary to prepare various types of the wire pieces but the wire pieces 56 of one type is adequate. This fact enhances workability upon constructing the rotor coil 54.

Figure 4:
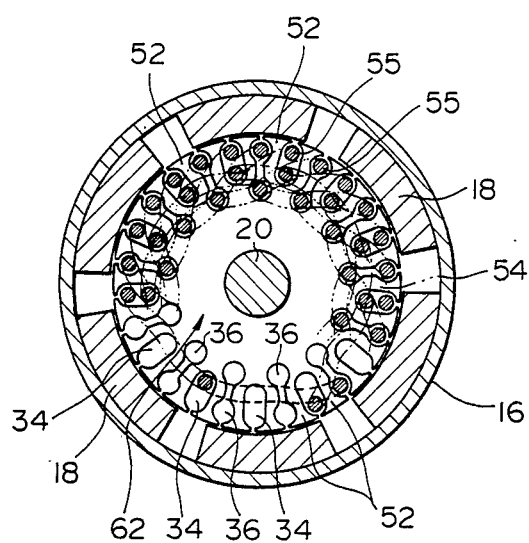
FIG. 4 is a front view partly in section of a modified form of the dc motor in FIG. 1, with a part of rotor coil omitted and another part illustrated by phantom lines.

A modified form of the dc motor in FIG. 1 is illustrated in FIG. 4, in which the number of shallower slots 34 of the rotor core 62 is equal to that of deeper slots 36. Therefore, the shallower slots 34 and the deeper slots 36 are alternately disposed along the periphery of the rotor core 62 without any exception in their arrangement. In this case, that is, when the numbers of the respective shallower and deeper slots 34 and 36 are even, the total number K of the shallower and deeper slots 34 and 36 must be defined by the following formula:

$$K=(n+N)\times(P/2)\pm 1$$

where the n is the back pitch of the rotor coil 54, N is the front pitch of the rotor coil 54 and P is the number of the field poles of the motor or the number of the permanent magnets 18. For example, when the back pitch, the front pitch and the number of the field poles are four, five and six respectively, the total number of the shallower and deeper slots 34 and 36 must be twenty-six or twenty-eight. The slots 34 and 36 of such even numbers enable the wave winding of the rotor coil 54.

Although in the foregoing embodiment, both the shallower and deeper slots 34 and 36 are shown as semi-enclosed slots, open slots may be employed in place of these slots 34 and 36. Shallower slots having rectangular cross sections are used in place of the slots 34, and the outer and inner sections having square or other polygonal cross sections may be employed in place of the outer and inner cylindrical sections 46 and 50 of the deeper slot 36. Furthermore, it should be readily apparent that the rotor coil 54 may be wound in the manner of lap winding instead of the manner of wave winding, and that the front and back pitches of the coil 54 are not limited to the value disclosed in the foregoing embodiment but may be chosen properly depending on the number of the slots.

What is claimed is:

1. In a direct current motor including: a substantially cylindrical rotor core having a peripheral face and front and rear end faces; and a lead wire wound around the rotor core to form a rotor coil, the improvement wherein the rotor core having a plurality of shallower slots and a plurality of deeper slots, the shallower and deeper slots being circumferentially and alternately disposed in the peripheral face of the rotor core at angular intervals about the center axis of the rotor core so that each of the shallower and deeper slots extends axially from the front face to the rear face of the rotor core, whereby axially extending teeth are formed among the shallower and deeper slots, each of the shallower slots including first outer and inner radially aligned sections, each receiving a portion of the lead wire, each of the deeper slots including: second outer and inner radially spaced sections, each receiving a portion of the lead wire, the second outer section being arranged at such a position that the distance between the second outer section and the center axis of the rotor core is substantially equal to the distance between the center axis of the rotor core and the first outer section of each of the shallower slots, the second inner section being arranged at such a position that the distance between the second outer and inner sections is larger than the distance between the first outer and inner sections of each of the shallower slots; and a neck section interposed between the second outer and inner sections, the neck section having a width substantially smaller than widths of the second outer and inner sections.

2. A direct current motor according to claim 1, wherein each of the deeper slots has a substantially dumbbell-shaped cross section.

3. A direct current motor according to claim 2, wherein the distance between the second outer and inner sections of each of the deeper slots is not less than twice as long as the distance between the first outer and inner sections of each of the shallower slots.

4. A direct current motor according to claim 3, wherein each of the teeth has outer and inner portions, the outer portion being interposed between the first outer section of one of the shallower slots adjoining the corresponding tooth and the second outer section of one of the deeper slots adjoining the corresponding tooth, the inner portion being interposed between the first inner section of the adjoining shallower slot and the neck section of the adjoining deeper slot, and wherein the inner portion of each of the teeth has a thickness not less than the outer portion thereof.

5. A direct current motor according to claim 4, wherein the second outer section of each of the deeper slots is arranged at such a position that an imaginary line extending between the centers of the respective second outer and inner sections of each of the deeper slots inclines at an angle $\theta$ to an imaginary line extending between the center of the rotor core and the center of the second inner section of the same deeper slot, the angle $\theta$ causing the distance between the second outer section of any one of the deeper slots and the second inner section of another predetermined one of the deeper slots to be substantially equal to the distance between the first outer section of any one of the shallower slots and the first inner section of another predetermined one of the shallower slots.

6. A direct current motor according to claim 5, wherein the number of the shallower slots exceeds the number of the deeper slots by one, whereby specific two of the shallower slots adjoin directly each other.

7. A direct current motor according to claim 6, wherein the lead wire is wound around the rotor core in the manner of wave winding.

8. A direct current motor according to claim 7, wherein the lead wire comprises a plurality of U-shaped formed wire pieces electrically connected to one another, each having one and the other end portions, the one end portion being received in one of the first and second outer sections of one of the corresponding shallower and deeper slots, the other end portion being received in one of the first and second inner sections of another one of the corresponding shallower and deeper slots.

9. A direct current motor according to claim 8, wherein each of the shallower slots has a substantially elliptic cross section.

10. A direct current motor according to claim 4, wherein the number of the shallower slots is equal to the number of the deeper slots, and wherein the total number K of the shallower and the deeper slots is defined by the following formula:

$$K = (n+N) \times (P/2) \pm 1$$

where n is the back pitch of the rotor coil, N is the front pitch of the rotor coil, and P is the number of the field poles of the motor.

11. A direct current motor according to claim 10, wherein the lead wire is wound around the rotor core in the manner of wave winding.

12. A direct current motor according to claim 11, wherein the lead wire comprises a plurality of U-shaped formed wire pieces electrically connected to one another, each having one and the other end portions, the one end portion being received in one of the first and second outer sections of one of the corresponding shallower and deeper slots, the other end portion being received in one of the first and second inner sections of another one of the corresponding shallower and deeper slots.

13. A direct current motor according to claim 12, wherein each of the shallower slots has a substantially elliptic cross section.

* * * * *